United States Patent [19]

Esser

[11] Patent Number: 5,893,588
[45] Date of Patent: Apr. 13, 1999

[54] CONNECTION OF A COUPLING COLLAR TO AND END OF A HARDENED PIPE

[75] Inventor: Alexander Esser, Warstein, Germany

[73] Assignee: Esser-Werke GmbH & Co. KG, Warstein, Germany

[21] Appl. No.: 08/612,720

[22] Filed: Mar. 8, 1996

[30] Foreign Application Priority Data

Mar. 10, 1995 [DE] Germany .......................... 195 08 634
Mar. 1, 1996 [DE] Germany .......................... 196 07 871

[51] Int. Cl.$^6$ ................................... F16L 23/00
[52] U.S. Cl. ....................... 285/405; 285/16; 285/407
[58] Field of Search ................ 285/16, 363, 365, 285/405, 407, 414, 915

[56] References Cited

U.S. PATENT DOCUMENTS

| | | | |
|---|---|---|---|
| 974,975 | 11/1910 | Kelly | 285/405 X |
| 3,588,132 | 6/1971 | Edmondson | 285/915 X |
| 3,627,357 | 12/1971 | Sanders | 285/174 |
| 3,650,549 | 3/1972 | Pepper | 285/915 X |
| 3,796,445 | 3/1974 | Strott | 285/915 X |
| 3,830,530 | 8/1974 | Glover | 285/915 X |
| 3,848,904 | 11/1974 | Anderson | 285/915 X |
| 4,537,426 | 8/1985 | Carter | 285/915 X |
| 4,673,198 | 6/1987 | Pritchatt | 285/915 X |
| 5,011,196 | 4/1991 | Sabatier et al. | 285/916 X |
| 5,044,670 | 9/1991 | Esser | 285/16 |

FOREIGN PATENT DOCUMENTS

| | | |
|---|---|---|
| 998253 | 7/1965 | United Kingdom . |
| 9316302 | 8/1993 | WIPO . |

Primary Examiner—John A. Ricci
Attorney, Agent, or Firm—Friedrich Kueffner

[57] ABSTRACT

A connection of a coupling collar to the ends of hardened conveying pipes for fluidically conveying solids, such as, sands, gravels and concrete, includes a coupling collar with a connecting piece which is glued in a tension-proof manner to the outer surface of the end of a pipe and at least one wear ring is placed at least in the length portion of a connecting flange of the coupling collar at the end face of the pipe end.

8 Claims, 4 Drawing Sheets

CONNECTION OF A COUPLING COLLAR TO AND END OF A HARDENED PIPE

BACKGROUND OF THE INVENTION

1. Field of the Invention

The present invention relates to a connection of a coupling collar to an end of a hardened conveying pipe.

2. Description of the Related Art

Single-layer pipes for fluidically (hydraulically or pneumatically) conveying solids, such as sands, gravels or concrete, have at least on the inside thereof a hardened surface in order to provide as high a wear resistance as possible to the usually very abrasive solids. As a rule, the higher resistance to wear is produced by flame hardening.

In addition, pipes of composite sheet metal are known, such as pipes of double-layer plated metal.

In order to be able to connect pipes of the above-described type to a pipeline, and to make possible an exchange of individual pipes from the otherwise closed pipeline, it is known in the art to equip the pipes at the ends thereof with coupling collars and to couple the pipes to one another in a releasable manner by means of these coupling collars. In order to ensure that the connection has a high tensile strength, the coupling collars are welded to the ends of the pipes. However, because of the influence of the heat, welding always leads to an unsatisfactory hardness at least at the pipe ends, independently of whether the pipes are hardened prior to welding to the coupling collars or after welding.

If hardening is carried out prior to welding, it is possible initially to achieve a uniform hardening of the pipes through the desired depth thereof. However, this uniform hardening is at least partially eliminated as a result of the influence of heat caused during welding of the coupling collars. If the pipes are hardened after welding the coupling collars to the pipes, the better heat discharge occurring in the areas of the pipe ends produces the result that the hardening is better in the middle portions of the pipes than in the end portions thereof. In both cases, the pipe ends are less resistant to wear than are the middle portions of the pipes. Accordingly, it is always necessary to completely replace the pipes, even though only the pipe ends are worn. The middle portions of the pipes would still have a much longer service life.

British Patent 998 253 and WO 93/16302 disclose glued connections.

The proposal according to British Patent 998 253 deals with a special connection of a coupling collar to an end of a pipe which on the inside thereof is provided with a light reflecting coating. Two of such pipes are to be connected to one another without a gap and in an exact axial alignment. For this purpose, initially the two pipes are exactly machined at the inside and outside thereof and are then coated with a light-reflecting inner coating. Subsequently, after sliding rings of adhesive material onto the pipe ends, the pipe ends are slid into the connecting pieces of two coupling collars whose inner surfaces are also exactly machined. This produces a very precisely defined joining gap. By means of measuring devices, the pipes as well as the coupling collars are now precisely axially aligned relative to each other while maintaining the joining gap having narrow tolerances, and the pipes and the coupling collars are clamped relative to each other in this aligned position. The clamped position is maintained until the adhesive has resulted in a secure connection of the pipe ends to the pipe connecting pieces of the coupling collars.

In this proposal, the service life of the light-conducting pipes is not a concern. The only concern is the precise connection of the coupling collars to the pipe ends in order to ensure a problem-free axial alignment of two successive pipes.

WO 93/16302 discloses a glued connection of gear wheels to one another and to a shaft. The glued connection is produced with a joining material while maintaining transition fits. The purpose is to prevent high residual stresses as they are known in shrunk-on connections.

SUMMARY OF THE INVENTION

Therefore, in view of the prior art discussed above, it is the primary object of the present invention to provide a connection of coupling collars to ends of hardened pipes for fluidically conveying solids, such as, sands, gravels and concrete, wherein a uniform service life of the pipes over the entire length thereof is ensured.

In accordance with the present invention, the coupling collar of the connection has a connecting piece which is glued in a tension-proof manner to the outer surface of the end of the pipe and at least one wear ring is placed at least in the length portion of a connecting flange of the coupling collar at the end face of the pipe end.

The fact that the coupling collars are now glued with their connecting pieces to the pipe ends provides the significant advantage that the pipes can be subjected to a uniform hardening over the entire length thereof prior to connecting the coupling collars to the pipes. The fastening of the coupling collars to the pipe ends by gluing takes place without a heat supply, so that the desired hardness structure at the inner and possibly also at the outer surfaces of the pipe ends is not changed. Consequently, after the coupling collars have been fastened to the pipe ends, the resistance to wear at the pipe ends is exactly the same as that in the middle portions of the pipes.

The connecting pieces of the coupling collars now make it possible to have contact areas between the coupling collars and the outer surfaces of the pipe ends with such a size that the respective conditions of use of the pipes, i.e., conveying, for example, sand, gravel or concrete, can be taken specifically into consideration. It is of no consequence in this regard whether the coupling collars are constructed for the placement of shell-like coupling rings, or whether the coupling collars are provided with disc-like connecting flanges with coupling bores extending parallel to the longitudinal axes of the pipes, wherein threaded bolts are inserted in the coupling bores.

The invention also makes it possible to construct the coupling collars in such a way that worn pipes can be removed from a pipeline in transverse direction without changing the length of the pipeline and to introduce new pipes into the pipeline again in a transverse direction relative to the pipeline.

Within the scope of the present invention it is now also possible to construct the wall thicknesses of the pipes of the connecting pieces and of the connecting flanges of the connecting collars in such a way that the respective wear conditions, particularly as a result of turbulences at misaligned gaps or edges, can be taken into consideration in an optimum manner. For this purpose, at least one wear ring is placed at the end face at least at the inlet end of a pipe. Compared to the hardness of the pipe, the wear ring has an even greater resistance to wear.

However, within the scope of the invention, it is also possible to place at least one wear ring in the coupling collar at the outlet end of a pipe.

In accordance with a preferred feature of the present invention, the wear ring is glued into the coupling collar.

In accordance with another embodiment of the present invention, the coupling collar is constructed for placing a shell-shaped coupling ring thereon. For this purpose, the connecting flange of the coupling collar and the connecting piece are constructed in one piece from a piece of pipe of uniform wall thickness. A circumferentially extending coupling groove is provided in the pipe piece between the connecting flange and the connecting piece. The coupling groove receives a leg of the coupling ring. In this case, not only the entire inner cylindrical surface of the connecting piece, but also the inner surface of the coupling collar in the area of the coupling groove can be utilized for a large-surface adhesive connection to the outer surface of the pipe end. The connecting flange and the connecting piece preferably have the same outer diameter.

In accordance with another embodiment, the coupling collar is also composed of a pipe piece having a connecting flange as well as a coupling groove for placement of a shell-shaped coupling ring. However, in this case, at least the inner surface of the connecting piece is provided with a groove arrangement having one thread or several threads.

The grooves preferably have a rectangular cross section, wherein the axial length of the groove is significantly greater than the radial depth thereof. The groove arrangement may also extend into the area of the coupling groove.

In accordance with another feature of the present invention, at least one wear ring each is provided in the area of the connecting flange as well as in the area of the coupling groove. The wear rings may be individually received in the coupling collar or they may be placed directly next to each other. The wear rings may be of the same material or of different materials.

In accordance with another feature, the wear ring placed in the area of the connecting flange of the coupling collar has an axial projection which engages in a centering manner in the coupling collar in the area of the coupling groove.

In accordance with another embodiment, the connection according to the present invention includes a disc-shaped connecting flange having several coupling bores extending parallel to the longitudinal axis of the pipe. The connecting piece may be integrally connected to the connecting flange. If necessary, the inner cylindrical surfaces of the connecting flange of the connecting piece located on the same diameter may be utilized for gluing to the outer cylindrical surface of the pipe end.

The connecting piece may also be constructed of a pipe piece which is welded to the connecting flange. Also in this case, the inner cylindrical surfaces of the connecting flange and of the connecting piece may be on the same diameter, so that they can be glued without problems to the outer cylindrical surface of the pipe end over a large surface area.

It is possible to place only one wear ring in the coupling collar, or several wear rings may be individually received in the coupling collar and may be secured by gluing.

Instead of a cylindrical inner surface, at least the connecting piece may be provided with a helically shaped groove arrangement.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
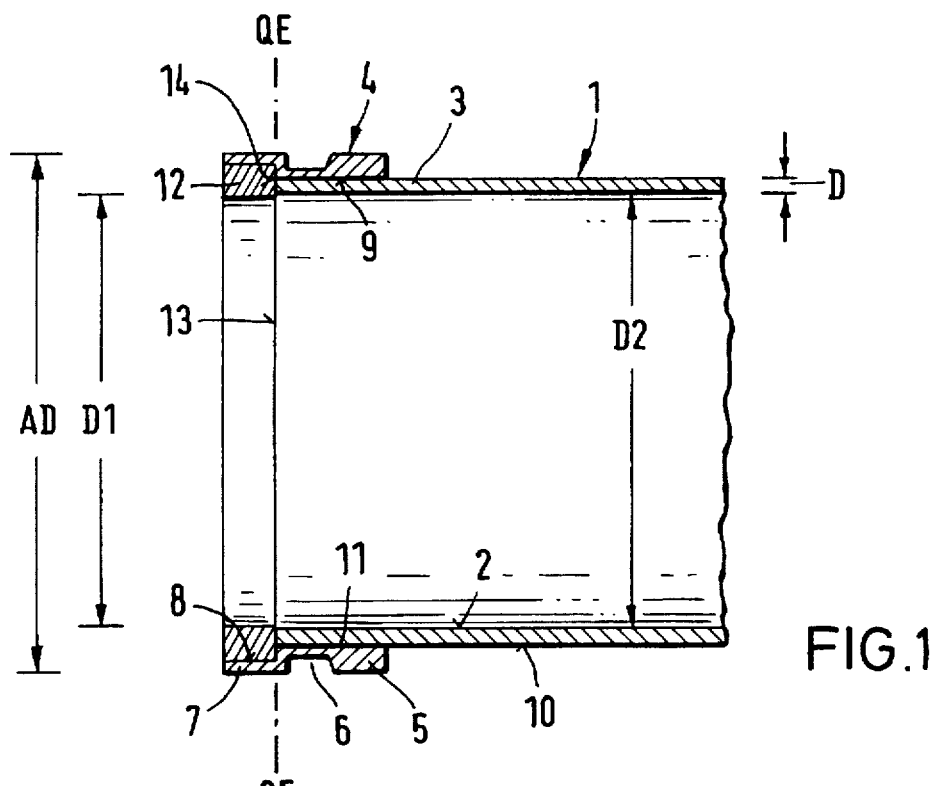
FIG. 1 is a vertical longitudinal sectional view of an inlet area of a pipe for conveying concrete.

FIGS. 1–4 of the drawing each show a single-layer cylindrical pipe for conveying concrete. The pipe 1 has over the entire length thereof a uniform wall thickness D. For increasing the wear resistance to the concrete, the inner surface 2 of the pipe 1 is uniformly hardened over the entire length thereof and through a certain depth.

FIGS. 1–4 each show the inlet end 3 of a pipe 1. In order to be able to couple a pipe 1 to another pipe 1, a coupling collar 4, 4a is provided at the circumference of the inlet end 3. The coupling collar 4, 4a is produced from a pipe piece. The coupling collar 4, 4a includes a connecting piece 5, 5a, a trapezoidally shaped coupling groove 6 and a connecting flange 7 with an inner receiving chamber 8.

In all four embodiments shown in FIGS. 1–4, the connecting piece 5, 5a and the connecting flange 7 have the same outer diameter AD.

Figure 2:
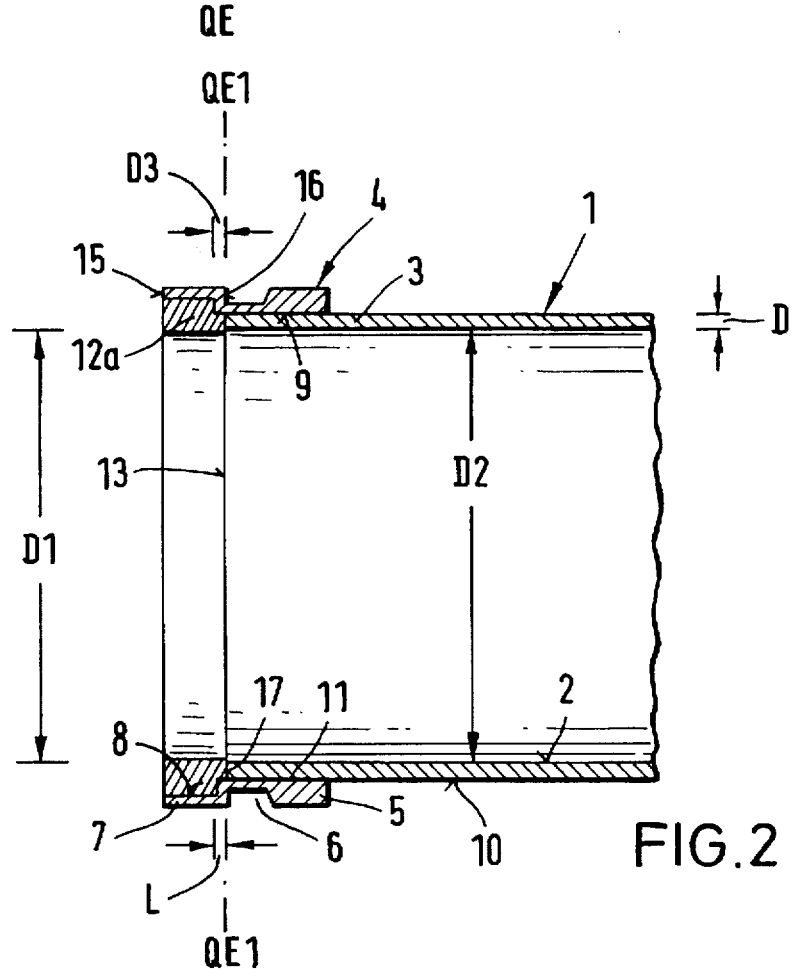
FIG. 2 is a vertical longitudinal sectional view of the inlet area of a pipe for conveying concrete in accordance with a second embodiment of the present invention.

In the embodiments of FIGS. 1 and 2, the inner surface 9 of the coupling collar 4 is cylindrical in the areas of the coupling groove 6 and the connecting piece 5. This cylindrical surface 9 is connected to the cylindrical surface 10 of the inlet end 3 in a tension-proof and compression-proof manner by means of an adhesive 11.

In the embodiment of FIG. 1, a wear ring 12 is glued into the receiving chamber 8 at the end face of the inlet end 3. The wear ring 12 is of a material which has a greater resistance to wear than the material of the hardened pipe 1. The wear ring 12 has a rectangular cross section. The inner diameter D1 of the wear ring 12 is smaller than the inner diameter D2 of the pipe 1. The end face 13 of the inlet end 3 extends in a common transverse plane QE with the radial inner wall 14 of the receiving chamber 8.

The embodiment of FIG. 2 differs from that of FIG. 1 in that the end face 13 of the pipe 1 extends in a transverse plane QE1 which extends through the radial wall 16 of the coupling groove 6 adjacent the end face 15 of the coupling collar 4. In this case, the wear ring 12a has an integrally formed projection 17 which engages in a centering manner in the coupling collar in the area of the coupling groove 6.

Also in this case, the inner diameter D1 of the wear ring 12a is smaller than the inner diameter D2 of the pipe 1. The length L of the projection 17 corresponds approximately to the wall thickness D3 of the coupling collar 4 between the receiving chamber 8 and the coupling groove 6.

Figure 3:
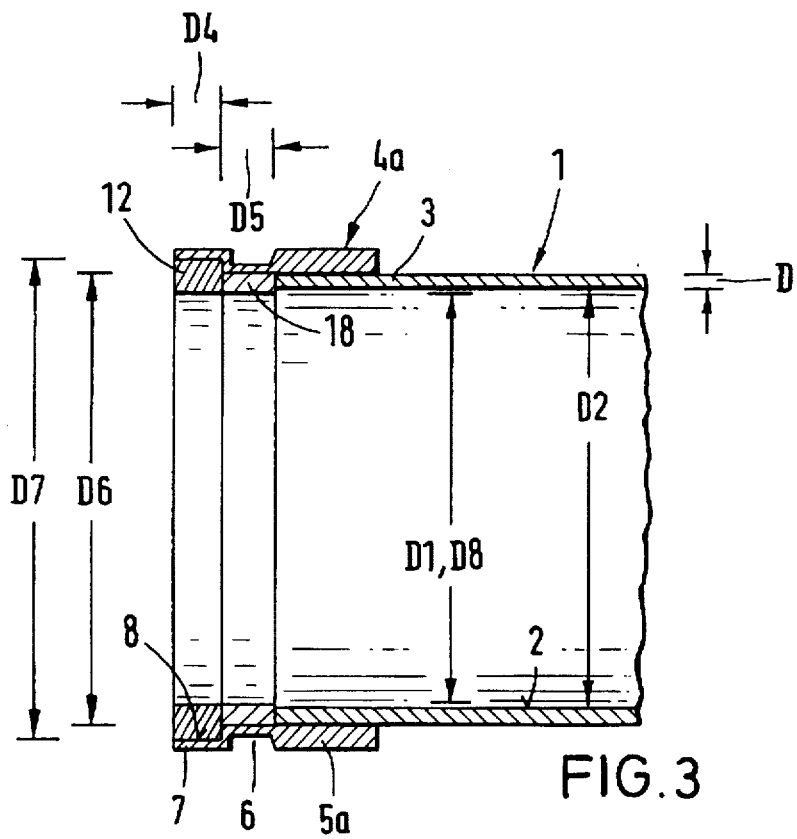
FIG. 3 is a vertical longitudinal sectional view of the inlet area of a pipe for conveying concrete in accordance with a third embodiment of the present invention.

In the embodiment of FIG. 3, adjacent the wear ring 12 placed in the area of the connecting flange 7, an additional wear ring 18 having a rectangular cross section and being of a material providing a greater resistance to wear, is provided in the area of the coupling groove 6. The two wear rings 12 and 18 are placed next to each other at the end face of the inlet end 3. They have approximately the same thickness D4 and D5. Because of the presence of coupling groove 6, the outer diameter D6 of the wear ring 18 is smaller than the outer diameter D7 of the wear ring 12 glued into the receiving chamber 8. The inner diameter D1 of the wear ring 12 corresponds to the inner diameter D8 of the wear ring 18. However, the inner diameters of both wear rings are smaller than the inner diameter D2 of the pipe 1.

The connecting piece 5a has a greater length as compared to the, connecting piece 5 of the embodiments of FIGS. 1 and 2, so that the necessary contact area for gluing to the pipe 1 is ensured.

Figure 4:
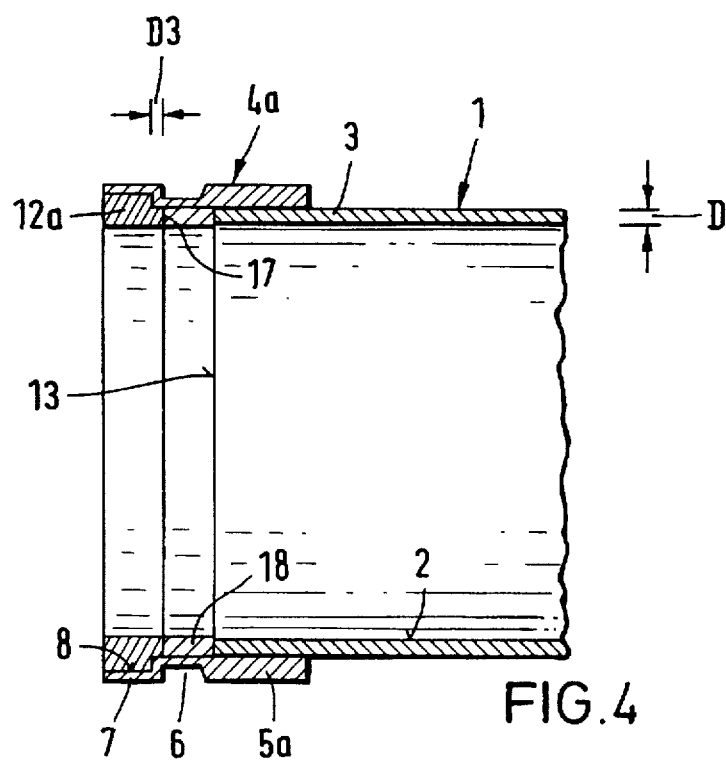
FIG. 4 is a vertical longitudinal sectional view of the inlet area of a pipe for conveying concrete in accordance with a fourth embodiment of the present invention.

The embodiment illustrated in FIG. 4 essentially is the same as the embodiment illustrated in FIG. 3 with the only difference that, as in the embodiment of FIG. 2, the wear ring 12a provided in the area of the connecting flange 7 is also provided with a projection 17 which engages into the area of the coupling groove 6. Consequently, the wear ring 18 located adjacent the end face 13 of the pipe 1 is offset toward the outlet end, not shown, of the pipe 1 by approximately the wall thickness D3 of the coupling collar 4a between the coupling groove 6 and the receiving chamber 8.

Figure 5:
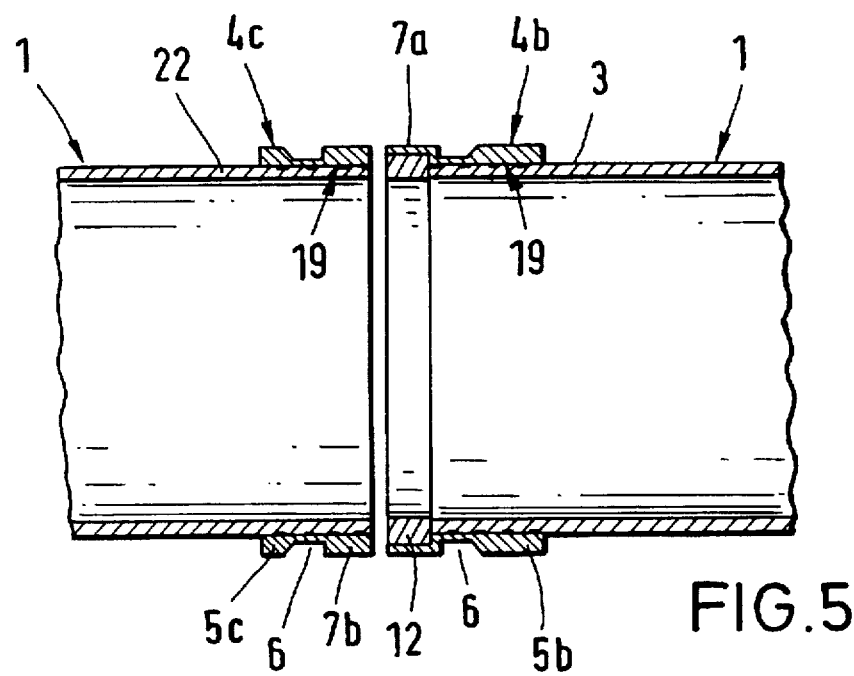
FIG. 5 is a vertical longitudinal sectional view of the inlet area of a pipe for conveying concrete in accordance with a fifth embodiment of the present invention.
Figure 6:
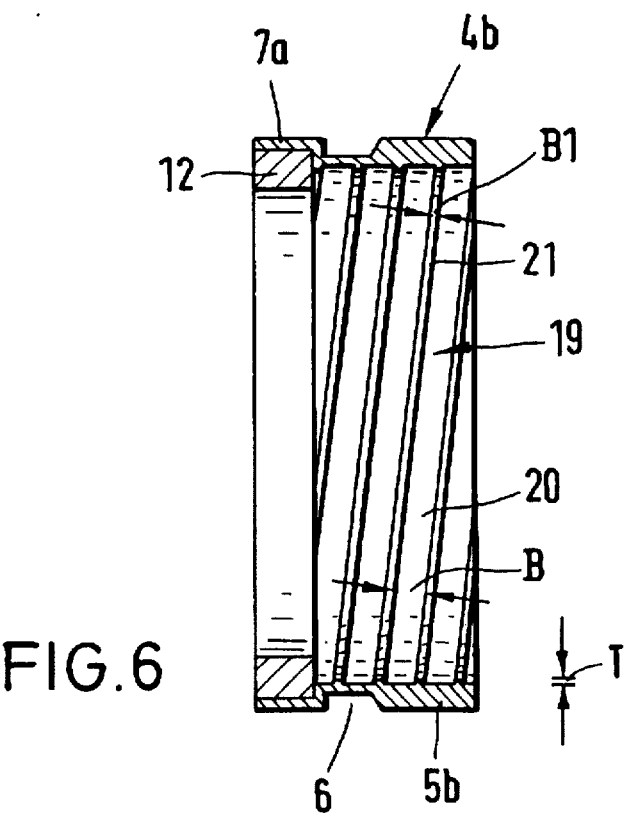
FIG. 6 is a vertical longitudinal sectional view, on a larger scale, showing a coupling collar with wear ring for the inlet area of a pipe of the embodiment of FIG. 5.

FIGS. 5 and 6 of the drawing show an embodiment at the inlet end 3 of a pipe 1 in which on the inner side of the coupling collar 4b is provided a groove arrangement 19 with three threads in the area of the coupling groove 6 and the connecting piece 5b. The width B of the grooves 20 in longitudinal direction of the pipe 1 is significantly greater than the depth T of the grooves 20. In this embodiment of the invention, the ratio of width B to depth T is approximately 27:1. The ratio of the width B of the grooves 20 to the width B1 of the webs 21 separating two adjacent grooves 20 is approximately 4:1.

In this embodiment, the coupling collar 4b is also glued to the inlet end 3 as well as to the wear ring 12 received at the end face in the coupling collar 4b.

The embodiment of FIGS. 5 and 6 can also be provided with at least two wear rings 12a, 18, as is the case in the embodiments of FIGS. 2, 3 and 4.

In addition, FIG. 5 shows that a single-piece coupling collar 4c constructed of a pipe piece and having a connecting flange 7b, a coupling groove 6 and a connecting piece 5c, is provided at the outlet end 22 of the pipe 1. No wear ring is provided in the area of the connecting flange 7b. The coupling collar 4c has at the inner surface thereof a groove arrangement 19, as it is shown in FIG. 6. The coupling collar 4c is also glued in a tension-proof and compression-proof manner by gluing to the outlet end 22.

Figure 7:
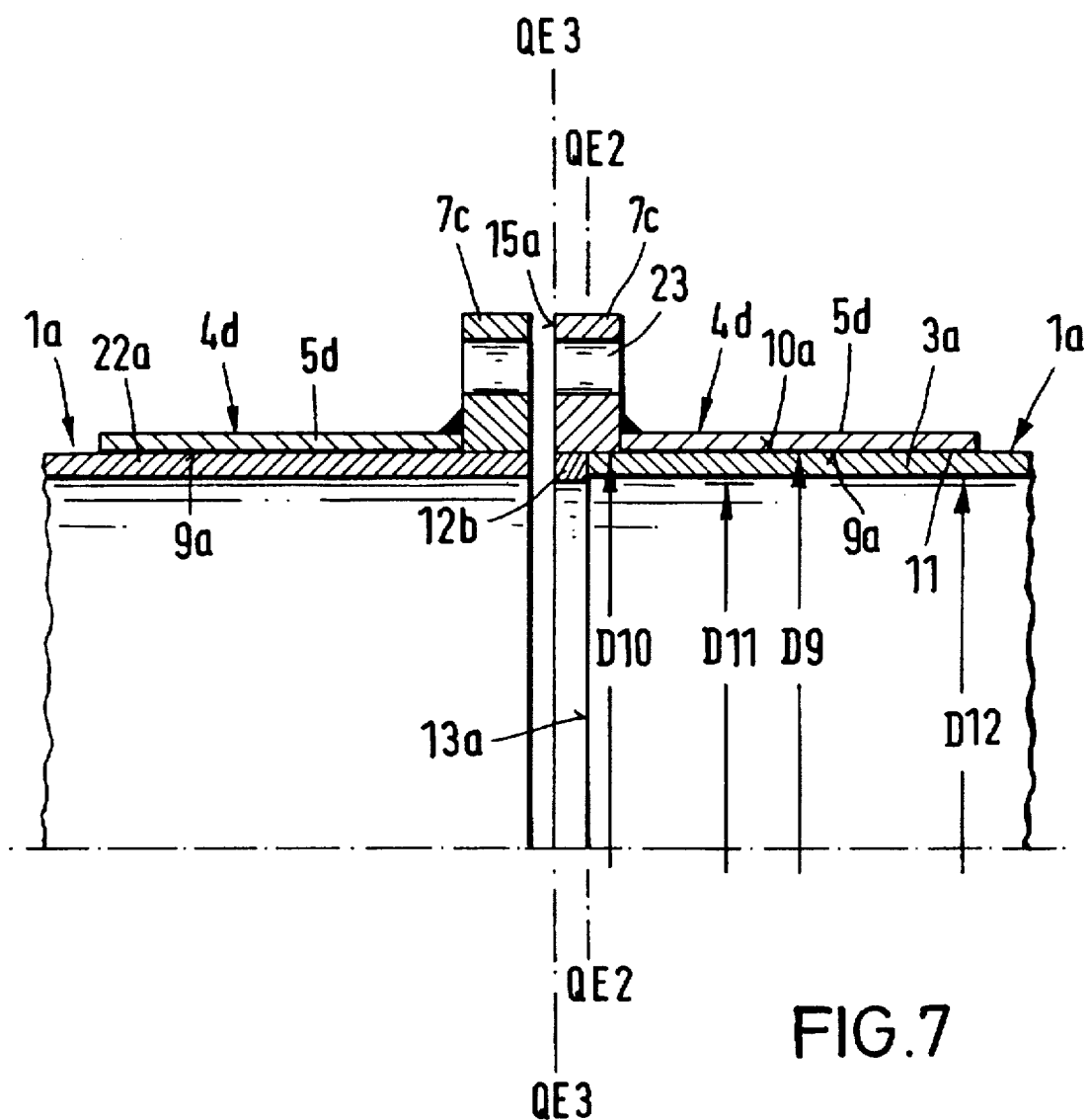
FIG. 7 is a vertical longitudinal sectional view of the outlet area and the inlet area of two successive pipes for conveying sand in accordance with a sixth embodiment of the present invention.

FIG. 7 of the drawing shows an embodiment which is preferably used in pipes 1a for conveying sands or gravels, wherein the pipes are at least hardened at the inner surfaces thereof.

In this case, a disc-shaped connecting flange 7c is provided as a component of a coupling collar 4d at the inlet end 3a of a pipe 1a. The coupling collar 4d is welded to a connecting piece 5d which is cut from a pipe piece. The connecting flange 7c and the connecting piece 5d have the same inner diameter D9. An adhesive 11 is placed in the joining gap between the connecting piece 5d and the surface tea of the inlet end 3a.

The end face 13a of the pipe 1a extends approximately in the center transverse plane QE2 of the connecting flange 7c. A wear ring 12b of a material having a greater resistance to wear is placed between the transverse plane QE2 and the transverse plane QE3 extending through the end face 15a of the connecting flange 7c. Consequently, the wear ring 12b has an outer diameter D10 which corresponds to the inner diameter D9 of the connecting flange 7c or of the connecting piece 5d. The inner diameter D11 of the wear ring 12b is smaller than the inner diameter D12 of the pipe 1a.

The connecting flange 7c has several circumferentially distributed bores 23. Threaded bolts, not shown, can be inserted in the bores 23. By means of the bolts and by means of nuts, also not shown, the pipe 1a can be connected to another adjacent pipe 1a through a coupling collar 4d glued to the pipe 1a and composed of the connecting flange 7c and the connecting piece 5d welded to the connecting flange 7c. No wear ring is provided at the outlet end 22a of this adjacent pipe 1a.

In the case of the embodiment of FIG. 7, the connecting piece 5d has a smooth cylindrical inner surface 9a. Consequently, the connecting piece 5d is glued over the full surface area thereof to the surface 10a of the pipe 1a. However, also conceivable is an embodiment according to FIGS. 5 and 6 in which the connecting piece 5d is provided with an internal groove arrangement 19 having grooves 20 with one or more threads.

While specific embodiments of the invention have been shown and described in detail to illustrate the inventive principles, it will be understood that the invention may be embodied otherwise without departing from such principles.

I claim:

1. A connection of a coupling collar to an end of a hardened pipe for fluidically conveying solids, wherein the coupling collar comprises a connecting piece, the pipe having a pipe end with an outer surface, the connecting piece being glued in a tension-proof manner to the outer surface of the pipe end, the coupling collar further comprising a connecting flange, and a wear ring being received within the coupling collar, the wear ring having an end face, the wear ring being mounted such that the end face of the wear ring contacts an end face of the pipe end, the connecting flange having an axial length, the wear ring having an axial length corresponding at least to the axial length of the connecting flange.

2. The connection according to claim 1, comprising a glued connection between the wear ring and the coupling collar.

3. The connection according to claim 1, wherein the coupling collar is comprised of a single-piece pipe piece having a circumferentially extending coupling groove between the connecting flange and the connecting piece, the connecting piece having an inner cylindrical surface, wherein at least the entire inner cylindrical surface of the connecting piece is glued from the end face of the pipe end to the outer surface of the pipe end.

4. The connection according to claim 1, wherein the coupling collar is comprised of a single-piece pipe piece with a circumferentially extending coupling groove between the connection flange and the connecting piece, wherein at least the connecting piece has an inner helically-shaped groove arrangement.

5. The connection according to claim 1, wherein the coupling collar is comprised of a single-piece pipe piece with a circumferentially extending coupling groove between the connecting flange and the connecting piece, wherein at least one wear ring each is received in the coupling collar in the areas of the connecting flange and the coupling groove.

6. The connection according to claim 5, wherein the wear ring received in the coupling collar in the area of the connecting flange has an axially extending projection, wherein the axially extending projection engages in the coupling collar in the area of the coupling groove.

7. The connection according to claim 1, wherein the connecting flange is disc-shaped and is connected to the connecting piece, the connecting flange having a plurality of coupling bores extending parallel to a longitudinal axis of the pipe and distributed over the circumference of the connecting flange, wherein at least the connecting piece is glued with an inner cylindrical surface to the outer surface of the pipe end.

8. The connection according to claim 1, wherein the connecting flange is disc-shaped and is connected to the connecting piece, the connecting flange having a plurality of coupling bores extending parallel to a longitudinal axis of the pipe and distributed over the circumference of the connecting flange, wherein at least the connecting piece has an inner helically-shaped groove arrangement.

* * * * *